United States Patent Office 2,862,395
Patented Dec. 2, 1958

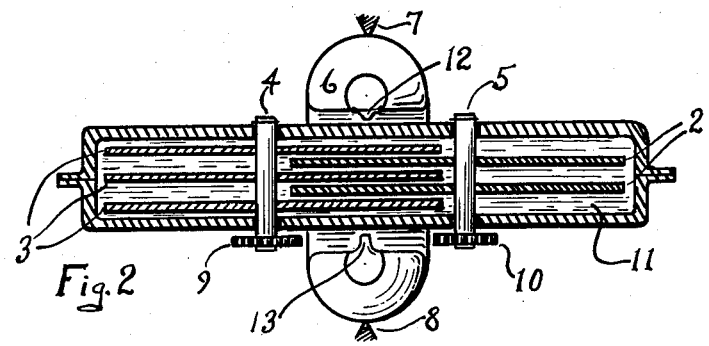
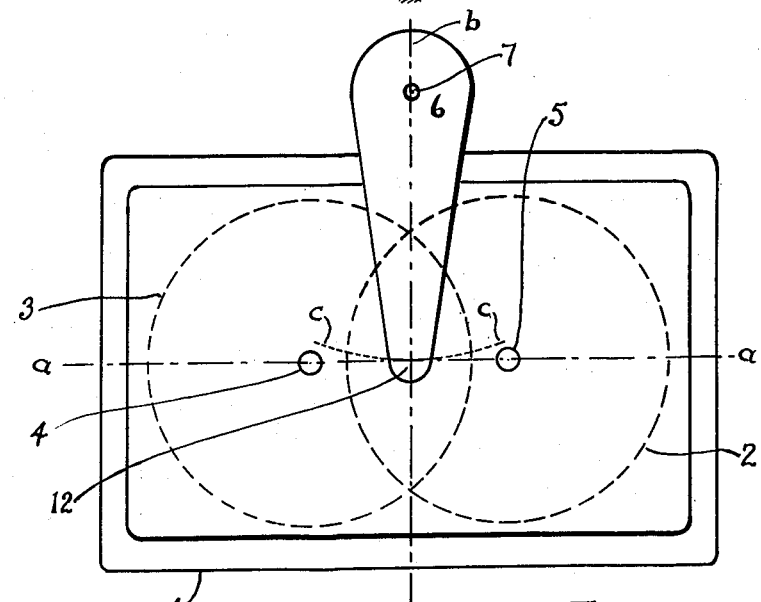
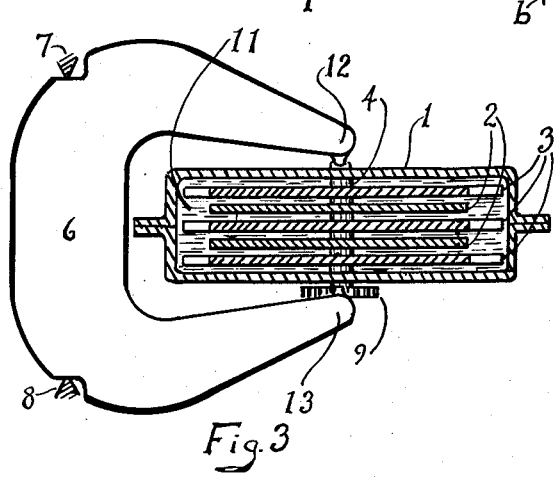

2,862,395
VARIABLE RATIO TRANSMISSIONS
Roland E. Gunther, Princeton Junction, N. J.

Application February 14, 1957, Serial No. 640,162

4 Claims. (Cl. 74—199)

There are various applications in which a controlled variable ratio between rotary input and output are required. The most common are the machine drives, but equally important are those in which the power level involved is only a very small fraction of a horsepower, such as in instruments. In the instrument size variable ratio transmissions or integrators in use up to the present there have been some disadvantages. Either the change of ratio has required forces out of all proportion to the forces involved in the transmission proper, making an automatic regulation unfeasible, or the construction has had to be executed to such exacting tolerances as to render the device very expensive and economically inapplicable to many uses.

It is an object of this invention to provide a variable ratio transmission of instrument size in which only small forces are needed to change the setting of the variable ratio control, that is forces in a similar order of magnitude to those being transmitted, thus permitting the device to be used for automatic control purposes.

It is also an object of this invention to provide a variable ratio transmission in which the intrinsic design is such that the actual manufacture may be unburdened by the need for extremely close manufacturing tolerances, thus making it possible for the device to be produced inexpensively.

The manner in which these objects are attained, and the basically novel features and mode of operation of the invention are elucidated in the following specification and the accompanying drawings.

Figure 1 is a plan view of the device.

Figure 2 is a side view with a part in vertical section on the line a—a of Figure 1.

Figure 3 is an end view with a part in vertical section on the line b—b of Figure 1.

In the drawings, Figure 1 shows a plan view of the device, with a magnet 6 projecting over and bracketing a housing 1. One pole piece 12 is shown, the other being directly beneath the pole piece 12 under the housing 1 and invisible in this view.

In Figure 1 there is also shown a pivot 7 on magnet 6 which is one of a pair, the other not visible in this view. The movement of which the magnet 6 is capable on its pivots is indicated by the arc c—c shown.

Within the housing 1 and indicated by the dashed circle is a stack of non-magnetic discs 2 affixed to and pivotable on a shaft 5 the end of which is shown in this figure. Overlapping the disc stack 2 is another disc stack 3 on a shaft 4 rotatably held in the housing 1.

In Figure 1 a line a—a is taken horizontally through the center of the housing 1, and another line is taken vertically through the center of the housing 1 and indicated by the letters b—b.

Figure 2 is a side view with a part in section of the device, the section being taken through the housing 1 of Fig. 1 and through the discs 2, 3 of Figure 1 on a vertical plane running through the line a—a shown in Figure 1.

In Figure 2 are shown in section the housing 1, the discs 2, the discs 3 referred to under the description of Figure 1. Not in section are the shafts 4 and 5 and the magnet 6. Indicated at 7 is the pivot also previously referred to. In addition, this view shows a lower pivot 8 for the magnet 6, and a gear 9 affixed to the shaft 4, with another gear 10 affixed to the shaft 5. The particular construction of the pole pieces 12, 13 of the magnet 6 are shown as being drawn down to tips.

Figure 2 also shows the housing 1 to contain a filling 11, consisting of a magma of discrete magnetizable particles in a lubricant.

The disposition of the pole pieces 12 and 13 with respect to the overlapping and interleaved discs of the disc stacks 2 and 3 is shown in Figure 2 to be such that the overlapping discs are bracketed by the pole pieces 12, 13. The pole pieces are also shown to be very close to the housing 1.

Figure 3 shows an end view with a section taken through the housing 1 of the device as shown in Figure 1 with the section taken on a vertical plane through the line b—b in Figure 1, the view of the magnet 6 also previously shown in Figure 1 appearing in this view as a side view.

In Figure 3 are shown the housing 1 and the discs 2 and 3 all as in a sectional view, with a portion of the discs 3 visible beyond the section. Also shown is the shaft 4 on which the discs 3 are rotatably held in the housing 1 and the gear 9 affixed to the shaft 4 outside of and below the housing 1. Within the housing 1 as in Figure 2 is shown the filling 11.

In Figure 3 to somewhat better advantage than in the previous figures, is shown the magnet 6, the magnet pivots 7, 8 and the pole pieces 12 and 13.

The device operates as follows: The rotary input is applied to one of the disc stacks as for instance to stack 3, the output being taken from the other disc stack, in this case from stack 2. Rotation from the input disc stack to the output disc stack is transmitted by what virtually amounts to a shaft of rigidised magma 11 between the pole pieces 12 and 13 intersecting the overlapping disc stacks essentially in a straight line between the pole pieces. The effect of the rigidised magma is such as to yield an effect as though the disc stacks were pairs of meshing gears whose radii are equal to the distance from the shafts 4 and 5 to the line of flux between the pole pieces 12 and 13. Swinging the magnet 6 as through the arc c—c in Figure 1 changes the effective "gear ratio" and varies the ratio of the rotational input on one disc stack with respect to the rotational output of the other disc stack. The ratio of input to output is stepless, and requires no more force than it takes to pivot the magnet. The reaction that might be set up within the housing by magnetisation of the magma and movement caused in it by the discs being essentially perpendicular to the freedom of movement to which the magnet may be subjected, the control force that actuates the ratio change by swinging the magnet need not fight any reactionary forces.

The pole pieces of the magnet 6 are purposely drawn to tips as shown to localize the area of magnetization and rigidisation of the magma, and thus reduce friction in the system. In order to maintain an optimum ratio of power available to that applied the discs are made of relatively rigid material to prevent excessive deformation and drag, and their power transmitting capacity at the point of magma magnetization is enhanced by providing them with a roughened surface or better by perforating them with a large number of very small holes. Non-magnetic metals and plastics will be useful as materials of construction for the discs, but in instances where there is no danger of extreme shock, photoetched glass discs are preferred.

The magma may consist of a choice of a variety of materials such as are used and have been reported for use in magnetic clutches; carbonyl iron and graphite, with or without oil are applicable.

The magnet, while illustrated in the form of a conventional permanent magnet, will do the same job if constructed as an electromagnet, and an electromagnet may be preferred where the device is meant to be rendered inoperable at will, to be cut in by the application of current when it is needed; it being therefore expressedly stated that the magnet may be of any type.

The housing is made of a non magnetic material in order not to interfere with the lines of flux of the magnet. The practical proportions will be much different from those shown for the purpose of this exposition, and will necessarily have a very small gap between the pole pieces 12 and 13, with the housing at this area and the discs made very thin, and the discs very closely spaced.

I claim:

1. In a variable ratio transmission the combination of a pair of shafts, said shafts being essentially parallel; a pair of discs, each of said discs being axially mounted on one of said shafts, said discs being spaced in close proximity to one another and said discs overlapping one another; a medium containing discrete movable paramagnetic particles, said medium surrounding said discs; a magnetic flux producing means, said magnetic flux producing means creating a small-diameter high-density concentration of flux lines perpendicularly intersecting the said overlapping discs in their area of overlap, and said magnetic flux producing means being movable parallel to said discs.

2. In a variable ratio transmission the construction of claim 1, wherein the said magnetic flux producing means comprises a permanent magnet.

3. In a variable ratio transmission the combination of a pair of shafts, said shafts being essentially parallel, a pair of disc stacks, each said disc stack comprising a multiplicity of similar discs and each said disc stack axially mounted on one of said shafts, said disc stacks overlapping and the said discs from the said pair of stacks alternately interleaved in the areas of said overlap, and said interleaved overlapping discs in close proximity to one another; and a magnetic flux producing means, said magnetic flux producing means creating a small-diameter high density concentration of flux lines perpendicularly intersecting the said overlapping disc stacks in the said area of overlap, and said flux producing means being movable parallel to said discs in said disc stacks.

4. In a variable ratio transmission the construction of claim 3 wherein the said flux producing means comprises a permanent magnet.

References Cited in the file of this patent

UNITED STATES PATENTS

| | | |
|---|---|---|
| 2,640,364 | Nelson | June 2, 1953 |
| 2,688,879 | Logan et al. | Sept. 14, 1954 |
| 2,803,968 | Van Tilburg | Aug. 27, 1957 |